United States Patent
Park et al.

(10) Patent No.: US 8,892,253 B2
(45) Date of Patent: Nov. 18, 2014

(54) SWARM ROBOT AND SWEEPING METHOD USING SWARM ROBOT

(75) Inventors: Jeong-Seop Park, Gyeonggi-do (KR); Sang-Hoon Ji, Seoul (KR); Sang-Moo Lee, Gyeonggi-do (KR); Woong-Hee Shon, Gyeonggi-do (KR); Kyung-Tae Nam, Gyeonggi-do (KR)

(73) Assignee: Korea Institute of Industrial Technology, Chungcheongnam-Do (KR)

( * ) Notice: Subject to any disclaimer, the term of this patent is extended or adjusted under 35 U.S.C. 154(b) by 641 days.

(21) Appl. No.: 13/222,636

(22) Filed: Aug. 31, 2011

(65) Prior Publication Data
US 2012/0158176 A1   Jun. 21, 2012

(30) Foreign Application Priority Data
Dec. 17, 2010   (KR) .......................... 10-2010-0130168

(51) Int. Cl.
B25J 13/00   (2006.01)
B25J 9/16   (2006.01)
B25J 5/00   (2006.01)
G05D 1/02   (2006.01)

(52) U.S. Cl.
CPC ................ B25J 9/1617 (2013.01); B25J 5/007 (2013.01); G05D 1/0274 (2013.01); G05D 1/0291 (2013.01); G05D 1/0246 (2013.01); G05D 1/0278 (2013.01); G05D 2201/0203 (2013.01); Y10S 901/01 (2013.01)
USPC .............................................. 700/248; 901/1

(58) Field of Classification Search
CPC .............. B25J 5/007; B25J 9/16; B25J 11/00; G05D 1/024; G05D 1/027; G05D 1/029; G05D 2201/02

USPC .............. 901/1, 2, 46, 47; 700/245, 247, 248, 700/249, 258, 259
See application file for complete search history.

(56) References Cited

U.S. PATENT DOCUMENTS

| | | | |
|---|---|---|---|
| 6,408,226 B1* | 6/2002 | Byrne et al. | 700/258 |
| 6,687,571 B1* | 2/2004 | Byrne et al. | 700/245 |
| 8,379,967 B1* | 2/2013 | Bush et al. | 382/153 |
| 2005/0215171 A1* | 9/2005 | Oonaka | 446/301 |
| 2006/0161405 A1* | 7/2006 | Munirajan | 703/6 |
| 2007/0013510 A1* | 1/2007 | Yamada et al. | 340/539.1 |
| 2007/0058838 A1* | 3/2007 | Taniguchi | 382/103 |
| 2010/0094459 A1* | 4/2010 | Cho et al. | 700/248 |
| 2010/0114374 A1* | 5/2010 | Cho et al. | 700/259 |
| 2010/0286824 A1* | 11/2010 | Solomon | 700/248 |
| 2011/0135189 A1* | 6/2011 | Lee | 382/153 |
| 2012/0106829 A1* | 5/2012 | Lee et al. | 382/153 |
| 2013/0123658 A1* | 5/2013 | Oonaka | 600/549 |

OTHER PUBLICATIONS

Shon et al. "Efficient Sweeping Algorithm for Multi-Security Mobile Robots", The Korean Institute of Electrical Engineers, vol. 59, Issue. 9, 2010, p. 1686-1691, Aug. 2010.*

* cited by examiner

Primary Examiner — Thomas G Black
Assistant Examiner — Ce Li
(74) Attorney, Agent, or Firm — Rabin & Berdo, P.C.

(57) ABSTRACT

A swarm robot and a sweeping method using the swarm robot are provided. The swarm robot removes a plurality of objects in a given sweeping area, and at least two swarm robots collaborate to remove the individual object. The swarm robot searches the sweeping area, detects environment information of the sweeping area, locates the swarm robot in the sweeping area, generates a local map and an object map using the environment information and the acquired position, moves to the object according to the local map and the object map, and removes the object.

12 Claims, 15 Drawing Sheets

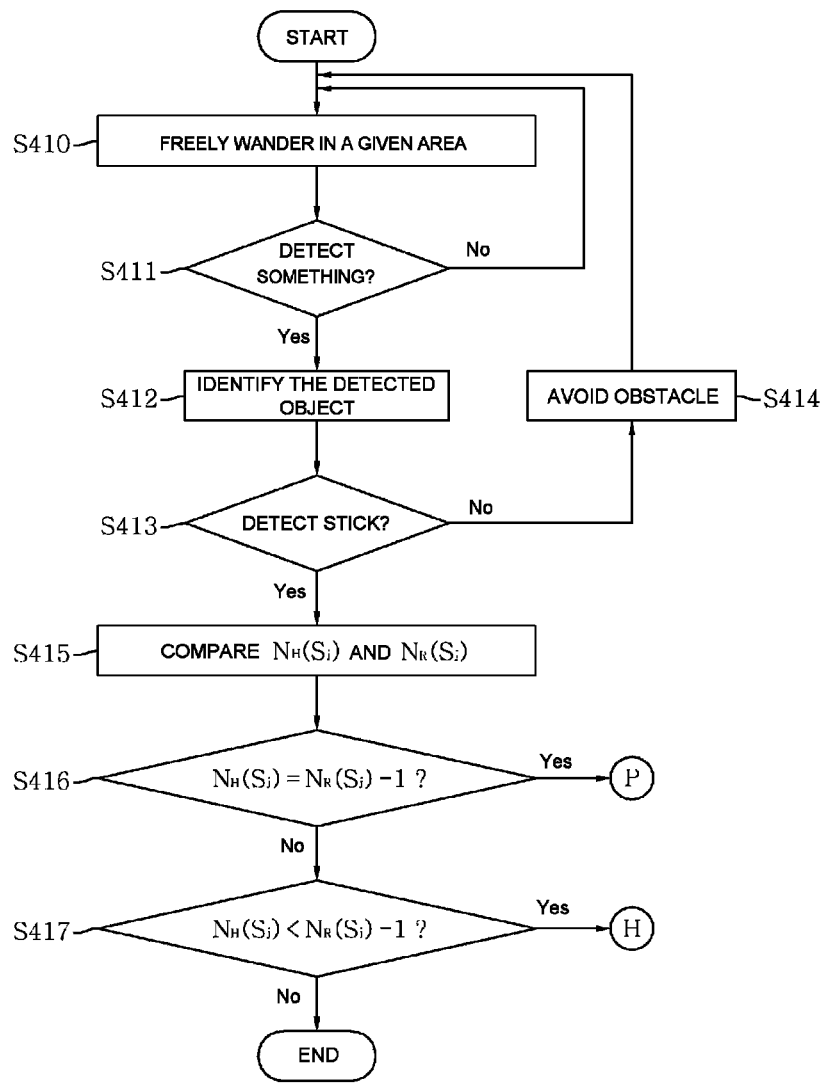

SWARM ROBOT AND SWEEPING METHOD USING SWARM ROBOT

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on, and assigned Serial No., the entire disclosure of which is hereby incorporated by reference.

TECHNICAL FIELD OF THE INVENTION

The present invention relates to a swarm robot and a sweeping method using the swarm robot.

BACKGROUND OF THE INVENTION

When searching and reconnoitering an area, multi-robots are more efficient than a single robot in view of time and space efficiency and stability against robot malfunctions. Researches are conducted on collaboration of the multi-robots, based on a centralized approach and a decentralized approach.

The centralized approach considers each robot as a single control module and operates a total set of robots as one large system. The centralized approach provides an optimal operation solution. However, it is operationally difficult to obtain operation states of the robots, and calculations of a robot behavior determination algorithm exponentially rise as the number of the robots increases.

Meanwhile, the decentralized approach allows each robot to determine its own behavior in accordance with a situation to achieve a group goal. Although the decentralized approach cannot provide the optimal solution, it exhibits stability to achieve the ultimate goal even when some robots malfunction. In addition, the operation complexity is low even when the number of the robots increases, and it is possible to determine the behavior even when partial environment information and robot information are given. On these bases, the decentralized approach is considered as a practical solution in field applications under an atypical environment.

Based on communication between the robots, the decentralized approach is classified into an explicit communication method and an implicit communication method. While the former is less efficient than the latter, it can be applied to underwater or complicate environments where visibility of the communication is not ensured.

The decentralized approach, which can be applied to actual atypical external environments, is studied to increase productivity. As an example, a market-based approach aims to increase the productivity by reallocating tasks based on bidding and auction algorithms among the robots. Researches also handle a stick-pulling problem using the collaboration of two robots in an unknown area, or the collaboration problem of two or more robots. Still, those researches and studies do not greatly increase the productivity of the robot.

SUMMARY OF THE INVENTION

To address the above-discussed deficiencies of the prior art, it is a primary aspect of the present invention to provide a swarm robot and a sweeping method using the swarm robot, for efficiently collaborating to sweep an unknown area and enhancing productivity.

According to one aspect of the present invention, a swarm robot removes a plurality of objects in a given sweeping area. At least two swarm robots collaborate to remove the individual object. The swarm robot includes a driving part for moving in the sweeping area; a manipulating part for gripping the object; a detecting part for detecting environment information of the sweeping area; a locating part for locating the swarm robot in the sweeping area; and a control part for generating a local map and an object map using the environment information fed from the detecting part and position information fed from the locating part, and controlling the driving part and the manipulating part to move to the object according to the local map and the object map and remove the object.

The object map may be generated by registering a first object initially detected to a highest level, a second object additionally detected by sweeping around the first object, to a second highest level, and registering the objects per level in order.

The control part may remove the object through a wander mode for searching the sweeping area to detect the object, a hold mode for waiting within a waiting time limit to remove the detected object, a sweep mode for searching an adjacent sweeping area to additionally detect a new object around the detected object, a circuit mode for orderly visiting a plurality of objects registered to the object map, and a pull mode for removing the detected object.

In the wander mode, the local map of the sweeping area may be updated and a revisit to an area where no object is detected may be limited.

In the hold mode, the waiting time limit of the revisit may be smaller than the waiting time limit of the initial visit to the detected object.

In the sweep mode, the object map may be generated and the mode may be switched to the circuit mode when the search on the adjacent sweeping area is completed.

The adjacent sweeping area may be away from the detected object by a certain distance.

In the circuit mode, to remove the object, an order of visiting objects detected but not removed may start from an object registered to the high level to an object registered to the low level, and proceed from the closest object to a current position to the farthest object from the current position on the same level.

According to another aspect of the present invention, a sweeping method using a swarm robot for removing a plurality of objects in a given sweeping area, at least two swarm robots collaborating to remove the individual object, includes searching the sweeping area to detect the object; detecting environment information of the sweeping area; locating the swarm robot in the sweeping area; generating a local map and an object map using the environment information and the acquired position; and moving to the object according to the local map and the object map and removing the object.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 4A through 4E are flowcharts of behavior modes of the swarm robot according to an exemplary embodiment of the present invention;

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
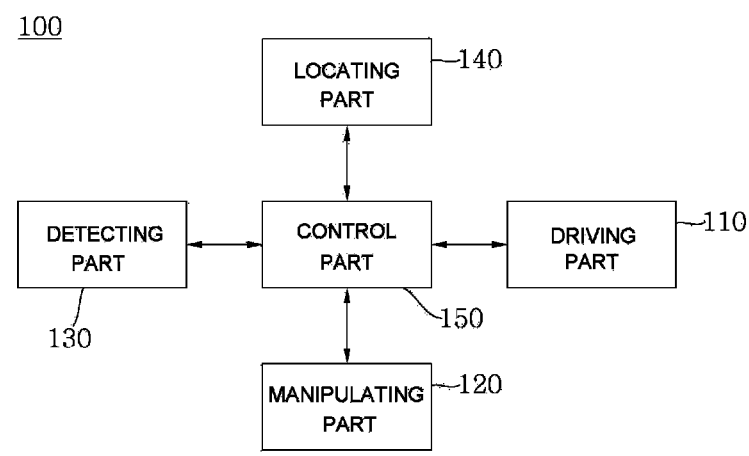
FIG. 1 is a block diagram of a swarm robot according to an exemplary embodiment of the present invention.
Figure 2:
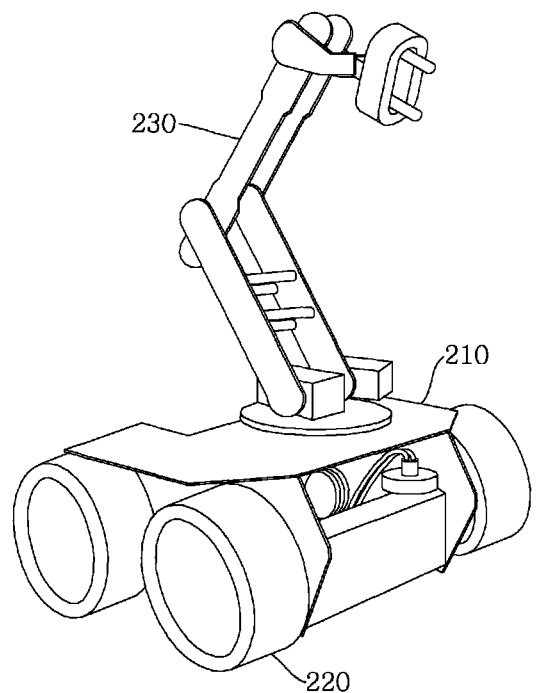
FIG. 2 is a simplified diagram of the swarm robot according to an exemplary embodiment of the present invention.

First, a swarm robot according to an exemplary embodiment of the present invention is explained in detail by referring to FIGS. 1 and 2.

FIGS. 1 and 2 are a block diagram and a simplified diagram respectively of the swarm robot according to an exemplary embodiment of the present invention.

As shown in FIG. 1, the swarm robot 100 includes a driving part 110, a manipulating part 120, a detecting part 130, a locating part 140, and a control part 150.

The driving part 110 includes a motor and a motor driver. The driving part 110 controls the swarm robot 100 to freely move over a sweeping area using a wheel or a caterpillar track and transfers a driving power to the manipulating part 120 to operate the manipulating part 120. The manipulating part 120 grips or picks up an object so that the swarm robot 100 can fulfill its task.

The detecting part 130 includes a camera or sensors so that the swarm robot 100 can collect environment information of the sweeping area. The locating part 140 can include a Global Positioning System (GPS) receiver. The swarm robot 100 can detect its position using a GPS-based navigation or a locating method based on a Simultaneous Localization and Mapping (SLM).

The control part 150 controls the driving part 110, the manipulating part 120, the detecting part 130, and the locating part 140 such that the swarm robot 100 can avoid an obstacle and fulfill the given task. For example, the control part 150 generates an environment map using the environment information fed from the detecting part 130 and the position information fed from the locating part 140, and controls the driving part 110 and the manipulating part 140 to avoid collision with other robots and grip and move the object. Hence, as moving and searching around in a certain area, the swarm robot 100 can convert the surrounding environment to the recognizable information and estimate its current position based on that information. In addition, the swarm robot 100 can discover and recognize the object in the corresponding space and thus remove the corresponding object.

Referring now to FIG. 2, the swarm robot 100 structurally includes a main body 210 a moving means 220, and a manipulator 230.

The main body 210 accommodates a device including all or part of the driving part 110, the detecting part 130, the locating part 140, and the control part 150 of FIG. 1. The main body 210 is supported by the moving means 220 and supports the manipulator 230.

The moving means 220 is driven by the motor of the main body 210. While the moving means 220 employs, but not limited to, wheels in FIG. 2, the moving means 220 may employ a caterpillar track or walking legs.

The manipulator 230 includes mechanic devices such as link, gear, and actuator, for various poses with joints and has various degrees of freedom. The manipulator 230 can include an end effector in a finger or pincer shape at the end, for gripping or lifting an object similarly to a human arm.

Note that the swarm robot 100 of FIG. 2 is a mere example and can be of other shapes.

Now, a sweeping method using the swarm robot according to an exemplary embodiment of the present invention is described in detail by referring to FIGS. 3 through 5F.

Figure 3:
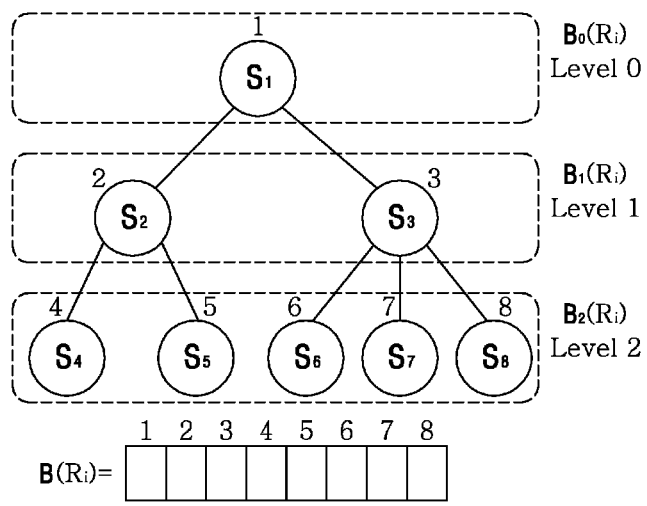
FIG. 3 is a diagram of a stick map generated by the swarm robot according to an exemplary embodiment of the present invention.

FIG. 3 depicts a stick map generated by the swarm robot according to an exemplary embodiment of the present invention, FIGS. 4A through 4E are flowcharts of behavior modes of the swarm robot according to an exemplary embodiment of the present invention, and FIGS. 5A through 5F are conceptual diagrams of the behavior modes of the swarm robot according to an exemplary embodiment of the present invention.

The sweeping method according to an exemplary embodiment of the present invention can be suggested as an algorithm for the plurality of the swarm robots to efficiently remove a plurality of objects randomly positioned in a given work environment. The object can be of various shapes. Hereinafter, the object is a stick by way of example.

Each stick can be removed only through the collaboration of two or more swarm robots, the work environment (the sweeping area) is two dimensional, and there are no fixed or mobile obstacles in the work environment. As explained earlier, the swarm robot, which does not have the environment map in advance, can generate a local environment map using its sensor and an accumulated map for the stick positions. Each swarm robot can acquire its position accurately, and obtain relative positions for the sticks in the sweeping area and the number of robots necessary to remove the sticks. The swarm robot can avoid collisions by itself, the swarm robots have the uniform performance (detection, movement, and manipulation), and the communication among the swarm robots are not allowed.

The fixed sticks in the unknown area can be removed through the collaboration of the robots, and the number of the robots and a working time required to remove the sticks are defined in advance. Terms and symbols used in the exemplary embodiments of the present invention are shown in Table 1.

TABLE 1

| Symbols | Semantics |
| --- | --- |
| R | a set of robots, ex) R = {$R_1, R_2, \ldots, R_N$} |
| N | the total number of robots |
| i | robot's number, ex) i = 1, 2, ..., N |
| S | a set of sticks, ex) S = {$S_1, S_2, \ldots, S_M$} |
| M | the total number of sticks |
| j | stick's number, ex) j = 1, 2, ..., M |
| $R(S_j)$ | a set of robots gripping a stick j, $R(S_j) \subset R$ |
| $D(S_j)$ | a distance between the center of the sweeping area and the boundary |
| $N_R(S_j)$ | the number of robots for removing the stick j |
| $N_H(S_j)$ | the number of robots waiting at the stick j |
| $T_P(R_i)$ | the accumulated time taken for the robot $R_i$ to remove the sticks |
| $T_S(R_i)$ | the accumulated time taken for the robot $R_i$ to searching for the sticks |
| $T_W(R_i)$ | the accumulated time taken for the robot $R_i$ to waiting for all the sticks |
| $T_W(R_i, S_j)$ | a current waiting time of the robot $R_i$ for the stick j |
| $E_W(R_i, S_j)$ | a maximum waiting time allowed to the robot $R_i$ for the stick j |
| $S_W(R_i, S_j)$ | a remaining time of the robot $R_i$ for waiting at the stick j $S_W(R_i, S_j) = E_W(R_i, S_j) - T_W(R_i, S_j)$ |
| $T_P(S_j)$ | a time required to remove the stick j |
| $B(R_i)$ | a set (bookmark) of the sticks registered to the robot $R_i$ with a tree structure $B(R_i) = \{B_0(R_i), B_1(R_i), \ldots, B_{h-1}(R_i),\}$ |
| $h(R_i)$ | a depth of the bookmark $B(R_i)$ of the robot $R_i$ |
| $N_B(R_i)$ | the total number of sticks registered to the bookmark $B(R_i)$ of the robot $R_i$ |
| $B_k(R_i)$ | a set of sticks at a level k in the bookmark of the robot $R_i$ the level 0 is the highest stick (the initially detected stick) |

The swarm robot needs to determine its own behavior. Upon detecting the stick, each swarm robot can wait or additionally search for other sticks until other swarm robots arrive at the corresponding stick.

An operating time of the swarm robot $R_i$ includes a searching time $T_S(R_i)$, a waiting time $T_W(R_i)$, and a stick pulling time $T_P(R_i)$. In exemplary embodiments of the present invention, productivity of one swarm robot and productivity of multiple swarm robots are defined as Equation 1 and Equation 2 respectively.

$$P(R_i) = \frac{T_P(R_i)}{T_S(R_i) + T_W(R_i) + T_P(R_i)} \quad \text{[Equation 1]}$$

$$P = \frac{\sum_{i=1}^{N_R} T_P(R_i)}{\sum_{i=1}^{N_R} T_S(R_i) + \sum_{i=1}^{N_R} T_W(R_i) + \sum_{i=1}^{N_R} T_P(R_i)} \quad \text{[Equation 2]}$$

However, since the time taken to remove the stick is predefined as a certain time, the numerator and the last term of the denominator in Equation 2 are fixed. Accordingly, the productivity of the swarm robot can be enhanced by minimizing the sum of the first term and the second term of the denominator. Thus, the stick-pulling problem of the swarm robot can be defined as a problem for deriving the behavior solution of the individual robot for maximizing the productivity of the stick removing task of the swarm robots, and a problem for deriving the behavior method of the swarm robots to minimize the sum of the stick waiting time of the swarm robots and the searching and moving time for discovering the sticks and to remove all of the sticks.

It is not easy to derive the behavior determining method of the swarm robot for always providing an optimal solution for the collaborative stick removal in the unknown area. Hence, a reasonable approach to solve this problem is to derive a behavioral strategy for reducing the number of times each swarm robot unnecessarily waits at the stick for a long time or revisits the area without any stick.

According to an exemplary embodiment of the present invention, the productivity of the stick removing task can be enhanced by adequately controlling the revisit to the sticks detected but not removed yet and increasing a probability of removing the corresponding sticks. A set of the sticks detected but not removed is managed using a stick map as shown in FIG. 3. The stick map, which is a data tree, arranges physical spatial position information of the sticks and topology information (hierarchical relations between level information and the sticks) in the data structure.

The stick at the highest level, that is, at the level 0 in this structure is initially discovered by the swarm robot, and the sticks additionally detected base on the first stick during the sweeping belong to the level 1 (the second stick and the third stick in FIG. 3). Consecutively, the fourth stick and the fifth stick detected around the second stick, and the sixth stick, the seventh stick, and the eighth stick detected based on the third stick lie at the lowest layer of the stick map in the discovery order.

The sticks vertically connected in the stick map, such as the second stick and the fourth stick or the third stick and the eighth stick, are close to each other in the physical space. The sticks in the horizontal level, such as the second stick and the third stick, are close to their common parent stick (the first stick in FIG. 3). The topology and the physical spatial relations of the stick map involve the productivity enhancement of the swarm robots by adjusting the visit order of the sticks when the swarm robots circuit the sticks to remove them.

Now, the behavioral strategy of the swarm robot according to an exemplary embodiment of the present invention is described in more detail.

The swarm robots fulfill their common task in five separate behavior modes including a wander mode, a hold mode, a sweep mode, a circuit mode, and a pull mode.

Figure 4B:
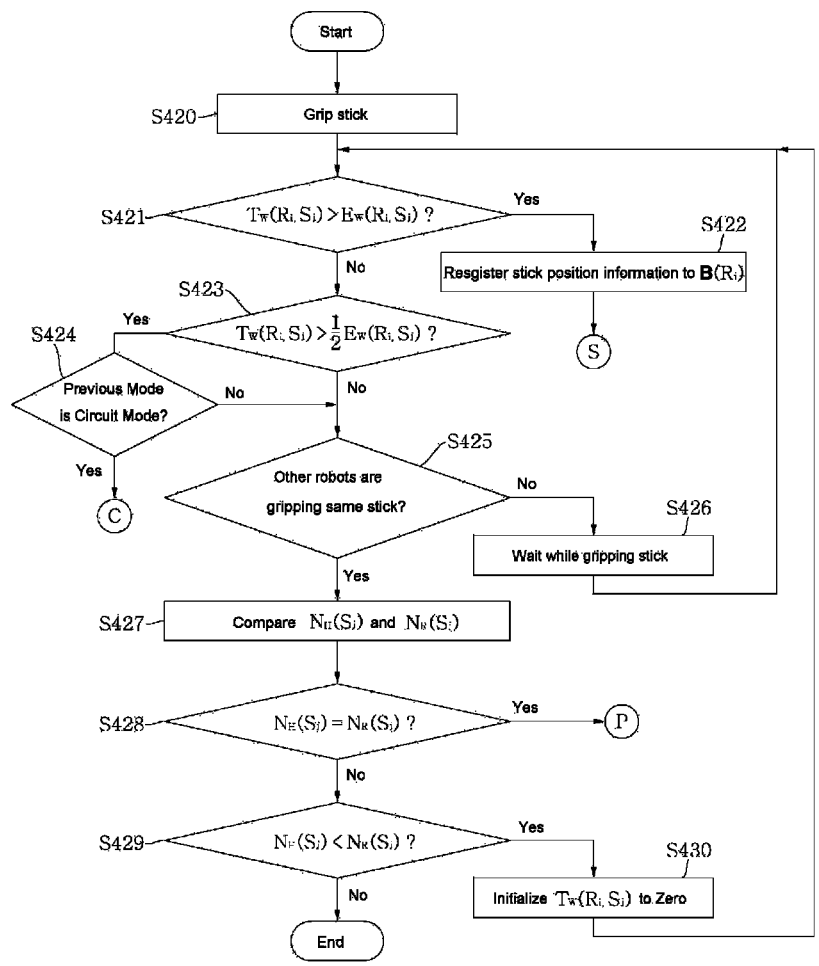
Figure 5A:
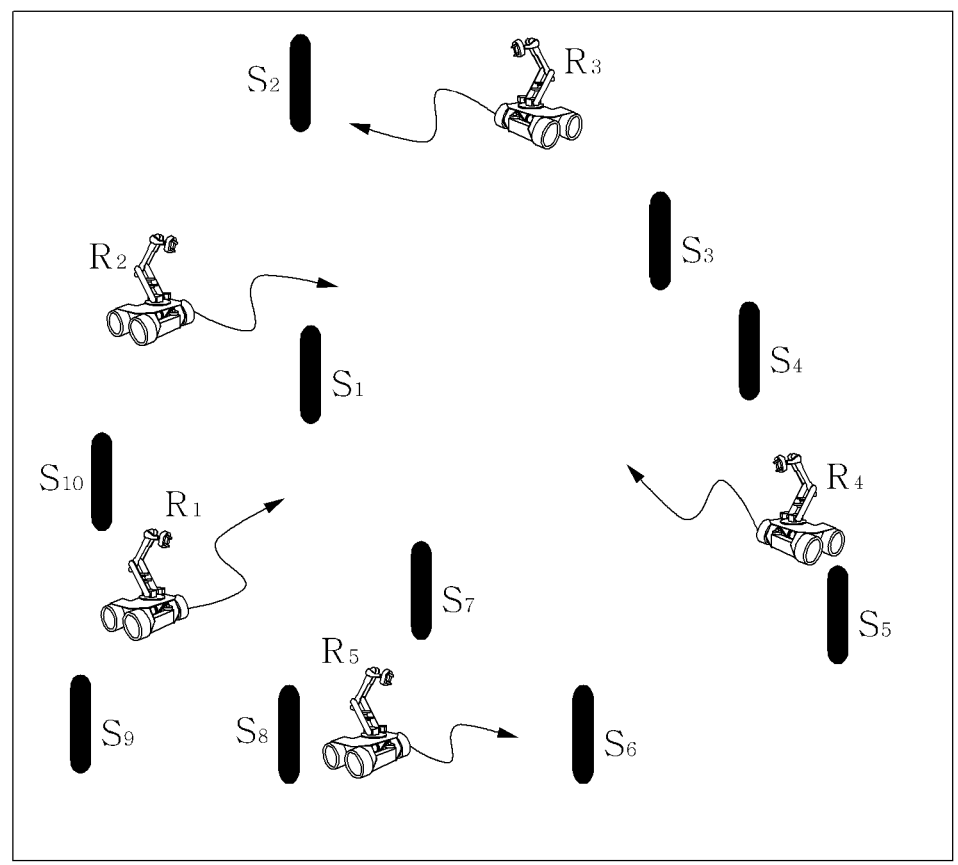
FIGS. 5A through 5F are conceptual diagrams of the behavior modes of the swarm robot according to an exemplary embodiment of the present invention.

The wander mode, which is the initial mode of the swarm robot, searches for a new stick. Referring to FIG. 4A, the swarm robot in the wander mode freely wanders over a given area and updates the local map (S410). As shown in FIG. 5A, the swarm robots $R_1$ through $R_5$ each can have their own search map which divides the sweeping area covering sticks $S_1$ through $S_{10}$ into sectors, and it is possible to limit the revisit of the swarm robot to the unnecessary area, that is, to the area including no stick.

The swarm robot wanders around until it discovers something (S411). Upon detecting something, the swarm robot identifies the detected thing (S412). The swarm robot determines whether the detected thing is the stick (S413). When the detected thing is not the stick, the swarm robot determines an obstacle and thus avoids the obstacle (S414), and then returns to S410. When the detected thing is the stick, the swarm robot compares $N_H(S_j)$ and $N_R(S_j)$ (S415) and determines a next behavior. The swarm robot determines whether $N_H(S_j)$ is equal to $N_R(S_j)-1$ (S416). When $N_H(S_j)$ is equal to $N_R(S_j)-1$, the swarm robot immediately enters the pull mode. When $N_H(S_j)$ is different from $N_R(S_j)-1$, the swarm robot determines whether $N_H(S_j)$ is smaller than $N_R(S_j)-1$ (S417). When $N_H(S_j)$ is smaller than $N_R(S_j)-1$, the swarm robot is switched to the hold mode. Otherwise, the swarm robot finishes this process.

In the hold mode, the swarm robot waits until the stick can be removed. Referring to FIG. 4B, when the hold mode starts, the swarm robot grips the stick found in the previous behavior mode (S420). Next, the swarm robot determines whether the waiting time $T_W(R_i,S_j)$ is greater than the waiting time limit $E_W(R_i,S_j)$ (S421). When $T_W(R_i,S_j)$ is greater than $E_W(R_i,S_j)$, the swarm robot registers position information of the stick to the bookmark $B_0(R_i)$ (S422) and changes its behavior mode to the sweep mode. In other words, when not able to remove the stick within the limited time, the swarm robot gives up on pulling the corresponding stick and enters the sweep mode to detect other stick.

When $T_W(R_i,S_j)$ is not greater than $E_W(R_i,S_j)$ (S421), the swarm robot determines whether $T_W(R_i,S_j)$ is greater than the half of the waiting time limit ($E_W(R_i,S_j)/2$) (S423). When $T_W(R_i,S_j)$ is greater than $E_W(R_i,S_j)/2$, the swarm robot determines whether the previous behavior mode is the circuit mode (S424). When the previous mode is the circuit mode, the swarm robot returns to the circuit mode. That is, as not able to remove the stick within the allowed time, the swarm robot gives up on pulling the corresponding stick and enters the circuit mode to visit other stick. Herein, the half of the waiting time limit is not essential, and the coefficient can be set to a value smaller than 1.

Figure 5B:
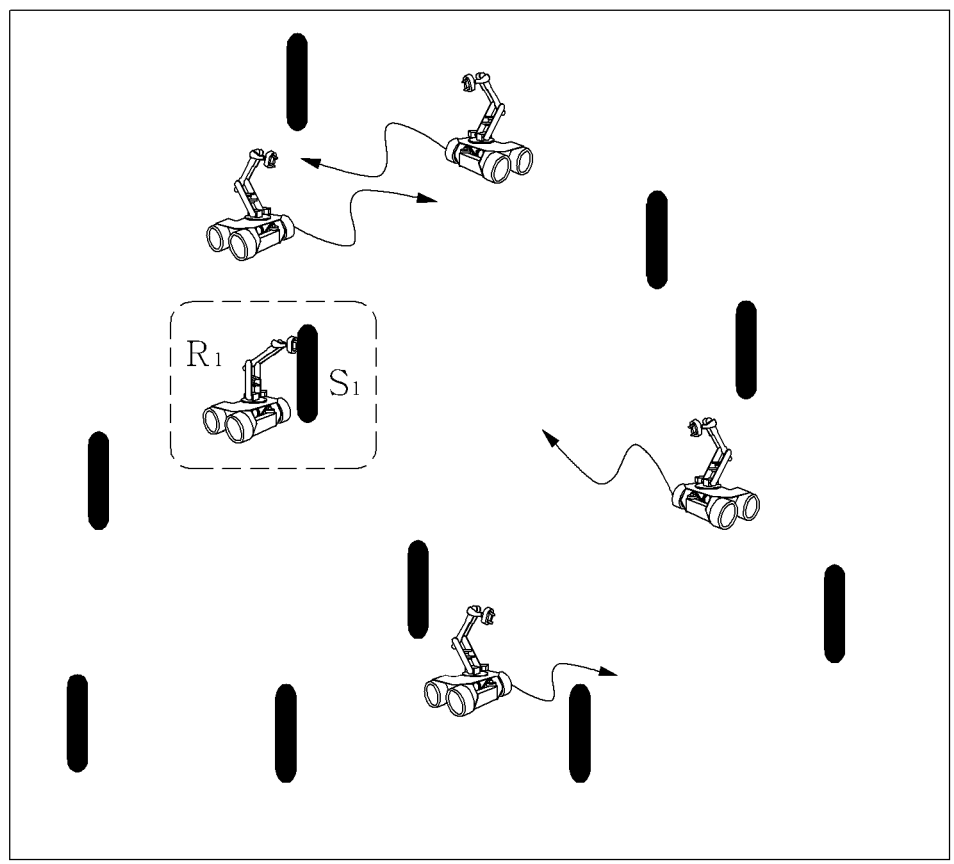

When the previous mode is not the circuit mode (S424) or when $T_W(R_i,S_j)$ is not greater than $E_W(R_i,S_j)/2$ (S423), the swarm robot determines whether another swarm robot is gripping the same stick (S425). When another swarm robot is not gripping the same stick, the swarm robot waits while gripping the stick (S426) and goes back to S421. In FIG. 5B, the swarm robot $R_1$ waits while gripping the stick $S_1$ and the other swarm robots $R_2$ through $R_5$ are not gripping the stick $S_1$.

When another swarm robot is gripping the same stick (S425), the swarm robot compares $N_H(S_j)$ and $N_R(S_j)$ (S427) and determines the next behavior. The swarm robot determines whether $N_H(S_j)$ is equal to $N_R(S_j)$ (S428). When $N_H(S_j)$ is equal to $N_R(S_j)$, the swarm robot immediately enters the pull mode. That is, when the swarm robots of the hold mode are gathered enough to pull the stick within the waiting time limit $E_W(R_i,S_j)$ or $E_W(R_i,S_j)/2$, the swarm robot enters the pull mode to remove the corresponding stick.

When $N_H(S_j)$ is not equal to $N_R(S_j)$ (S428), the swarm robot determines whether $N_H(S_j)$ is smaller than $N_R(S_j)$ (S429). When $N_H(S_j)$ is smaller than $N_R(S_j)$, the swarm robot initializes the waiting time $T_W(R_i,S_j)$ to zero (S430) and then returns to S421. Otherwise, the swarm robot finishes this process.

As stated earlier, when the waiting time $T_W(R_i,S_j)$ of the swarm robots is longer, the productivity degrades. The shorter waiting time limit $E_W(R_i,S_j)$, the shorter waiting time. However, when the waiting time is too short, it is less likely that the robots as many as needed are gathered. Thus, it is necessary to adequately adjust the waiting time limit $E_W(R_i,S_j)$ depending on the number of the swarm robots and the number of the sticks.

Figure 4C:
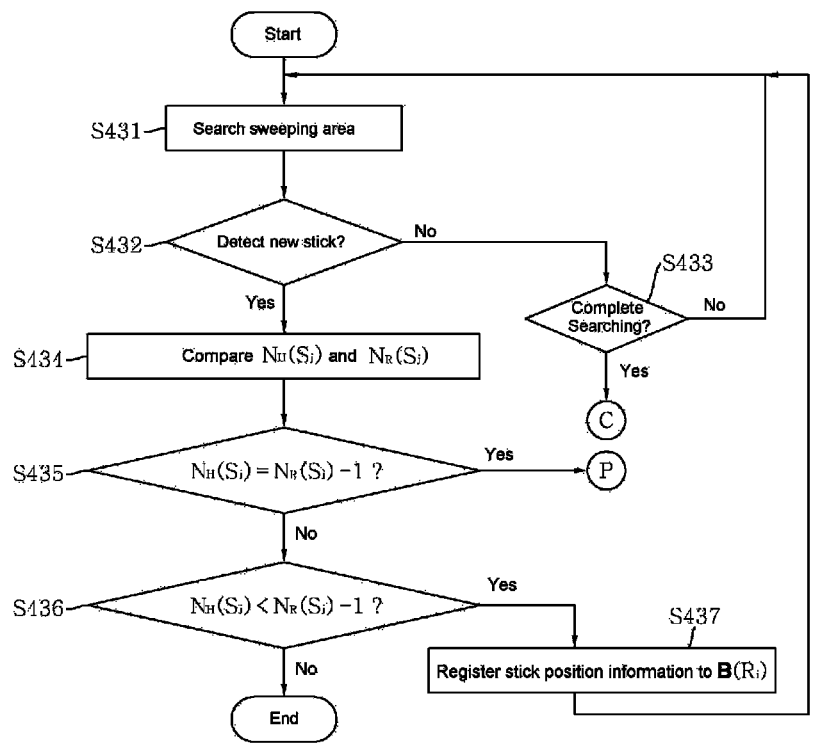
Figure 5C:
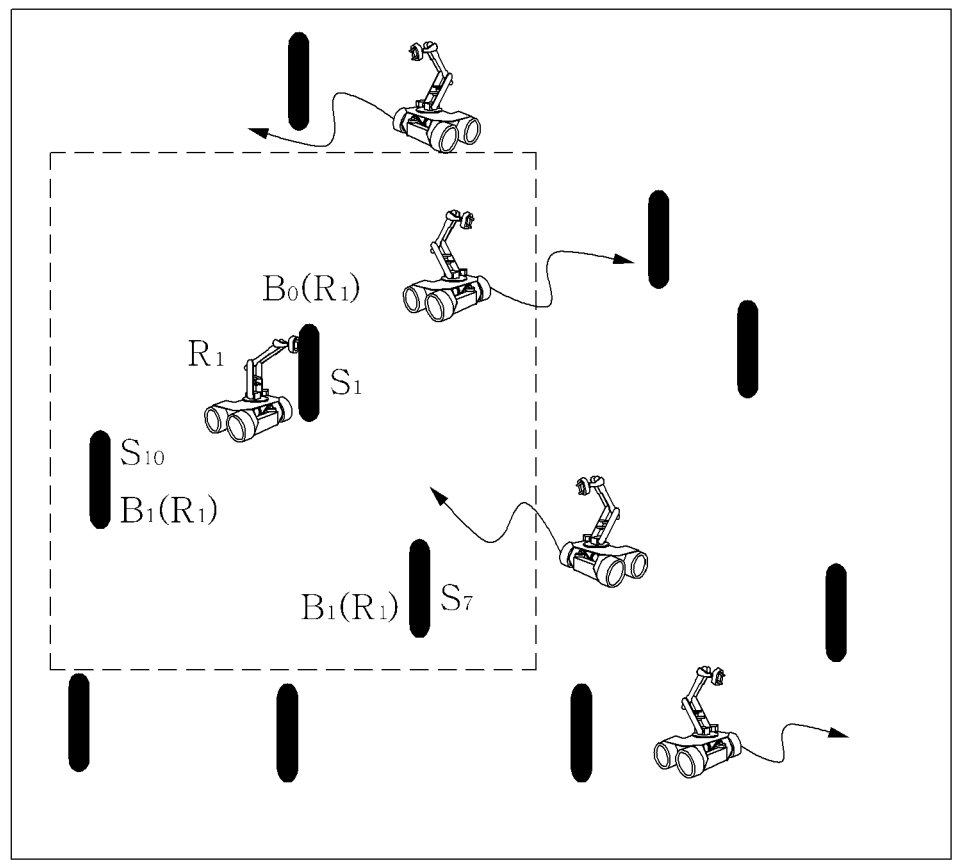

In the sweep mode, the swarm robot additionally detects the sticks to enhance the productivity of the stick removal, collects information, and generates the stick map. Referring to FIG. 4C, in the sweep mode, the swarm robot sweeps the sweeping area (S431) and attempts to detect the stick. The sweeping area in the sweep mode (hereafter, referred to as an adjacent sweeping area) is a regular square where a distance between the stick $S_j$ and the boundary of the adjacent sweeping area is $D(S_j)$. For example, as shown in FIG. 5C, the regular square marked by a dashed line based on the stick $S_1$ is the adjacent sweeping area around the stick $S_1$. Notably, the adjacent sweeping area can be set to other shapes than the regular square, such as rectangle, according to the size or the shape of the whole sweeping area.

The swarm robot determines whether a new stick is detected in the corresponding adjacent sweeping area (S432). Upon detecting a new stick, the swarm robot compares $N_H(S_j)$ and $N_R(S_j)$ (S434). Based on the comparison, the swarm robot determines whether $N_H(S_j)$ is equal to $N_R(S_j)-1$ (S435). When $N_H(S_j)$ is equal to $N_R(S_j)-1$, the swarm robot changes its behavior mode to the pull mode. When $N_H(S_j)$ is not equal to $N_R(S_j)-1$, the swarm robot determines whether $N_H(S_j)$ is smaller than $N_R(S_j)-1$ (S436). When $N_H(S_j)$ is smaller than $N_R(S_j)-1$, the swarm robot registers the information of the stick $S_j$ to the bookmark $B_k(R_i)$ (S437) and goes back to S431. Otherwise, the swarm robot finishes this process. The stick newly detected when the swarm robot searches for the sweeping area of the level k is registered to the next level k+1. Meanwhile, when a new stick is detected in the adjacent area, the search area in the sweep mode is expanded to the sum of all of the divided areas including any one stick in the stick map.

Figure 5D:
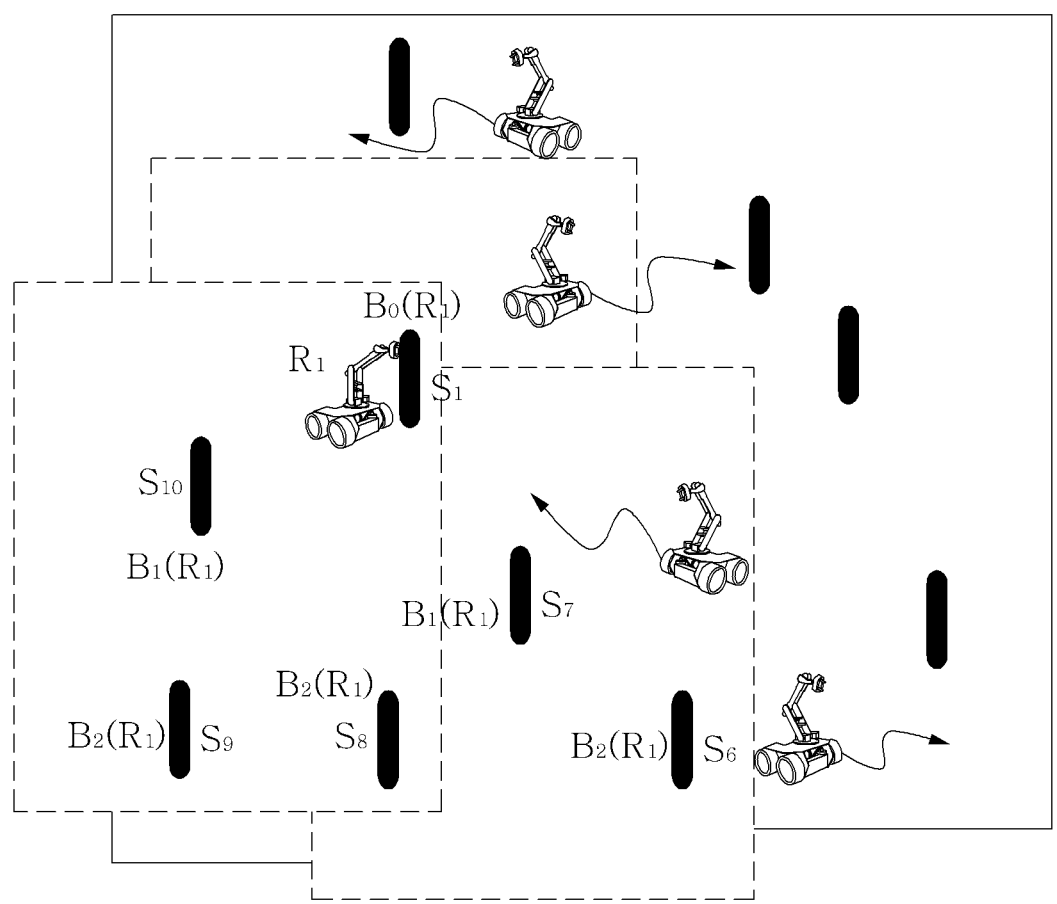

For example, referring to FIG. 5C, the swarm robot $R_1$ searches the adjacent sweeping area of the stick $S_1$ registered to the bookmark $B_0(R_1)$, detects the sticks $S_7$ through $S_{10}$, and registers them to the bookmark $B_1(R_1)$. Referring to FIG. 5D, the swarm robot $R_1$ searches the adjacent sweeping area of the stick $S_{10}$ registered to the bookmark $B_1(R_1)$, detects the sticks $S_8$ and $S_9$, and registers them to the bookmark $B_2(R_1)$. The swarm robot $R_1$ searches the adjacent sweeping area of the stick $S_7$, detects the stick $S_6$, and registers it to the bookmark $B_2(R_1)$.

When not detecting the new stick (S432), the swarm robot determines whether the search over the corresponding adjacent sweeping area is completed (S433). When the search is not completed, the swarm robot goes back to S431. When completing the search, the swarm robot enters the circuit mode. When the search over all of the adjacent sweeping areas is completed and there is no chance to detect a new stick any more, the swarm robot enters the circuit mode to remove the sticks registered to the stick map.

Figure 4D:
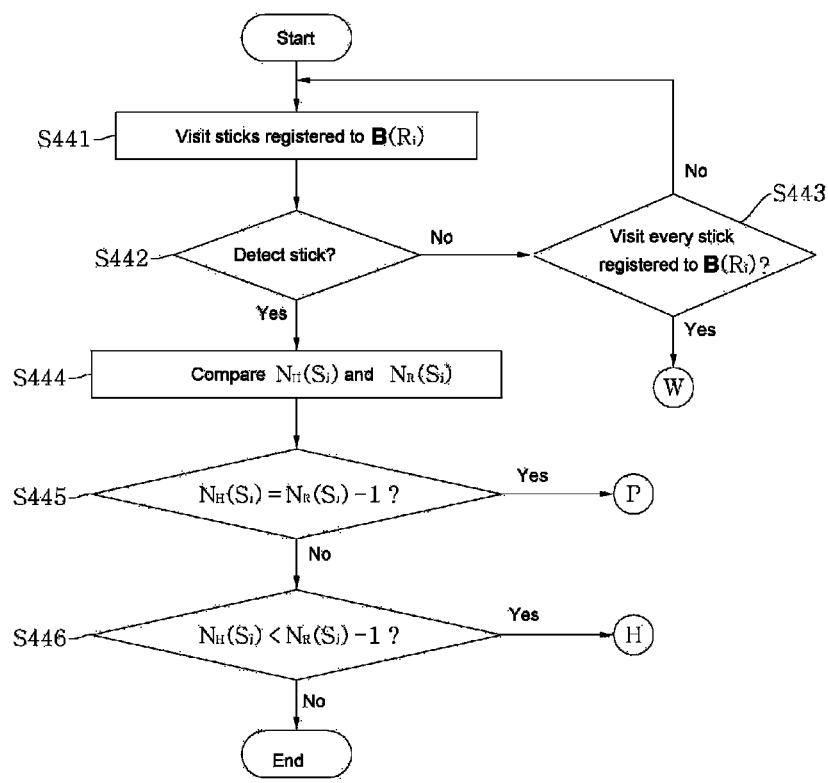
Figure 5E:
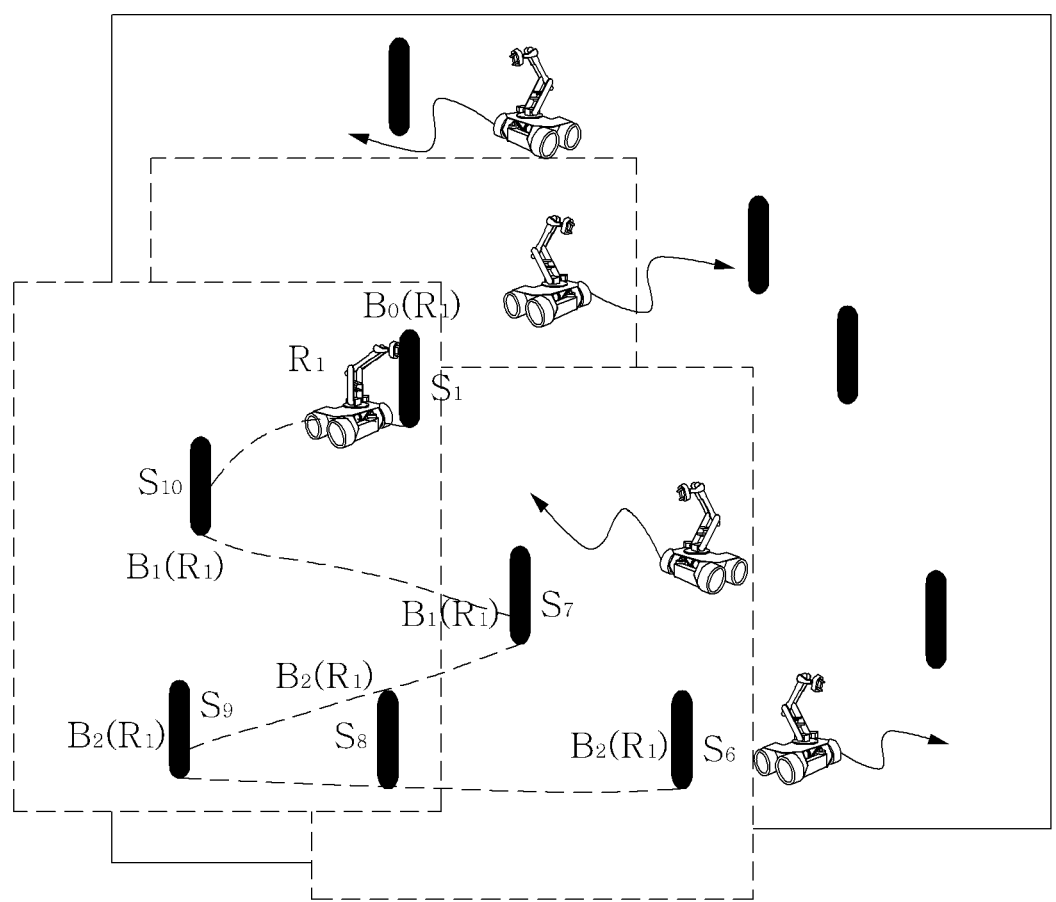

The circuit mode visits the sticks registered to the stick map in order. Referring to FIG. 4D, when the circuit mode starts, the swarm robot $R_i$ confirms the bookmark $B(R_i)$ and visits the sticks registered to the bookmark $B(R_i)$ (S441). The stick to visit can be selected using a breadth first search of the tree structure. That is, the swarm robot selects the stick to visit which is the closest to the current position among the sticks belonging to the same level as the current stick. For example, the visit order of the sticks registered to the bookmark $B(R_i)$ is shown in FIG. 3. For example, the swarm robot $R_1$ visits the stick $S_1$, the stick $S_{10}$, the stick $S_7$, the stick $S_9$, the stick $S_8$, and the stick $S_6$ in order as shown in FIG. 5E.

The swarm robot visits the stick and determines whether the stick is detected (S442). Upon detecting the stick, the swarm robot compares $N_H(S_j)$ and $N_R(S_j)$(S444). According to the comparison result, the swarm robot determines whether $N_H(S_j)$ is equal to $N_R(S_j)-1$ (S445). When $N_H(S_j)$ is equal to $N_R(S_j)-1$, the behavior mode of the swarm robot is switched to the pull mode. When $N_H(S_j)$ is not equal to $N_R(S_j)-1$, the swarm robot determines whether $N_H(S_j)$ is smaller than $N_R(S_j)-1$ (S446). When $N_H(S_j)$ is smaller than $N_R(S_j)-1$, the behavior mode of the swarm robot is switched to the hold mode. At this time, the waiting time limit is $E_W(R_i, S_j)/2$.

When detecting no stick (S442), the swarm robot determines whether all of the sticks registered to $B(R_i)$ are visited (S443). When all the sticks are visited, the swarm robot enters the wander mode. Otherwise, the swarm robot returns to S441 to visit the other sticks registered to $B(R_i)$.

Figure 4E:
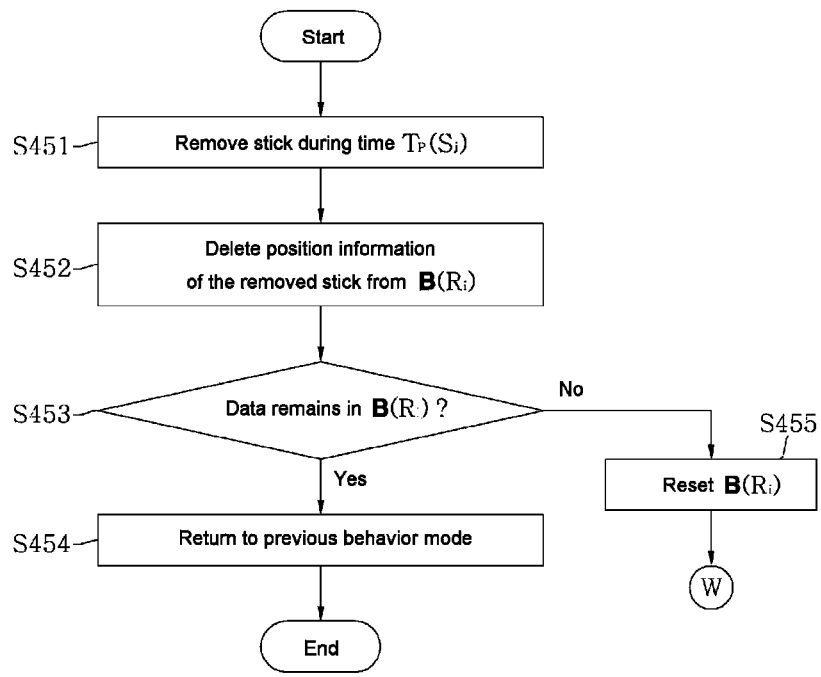
Figure 5F:
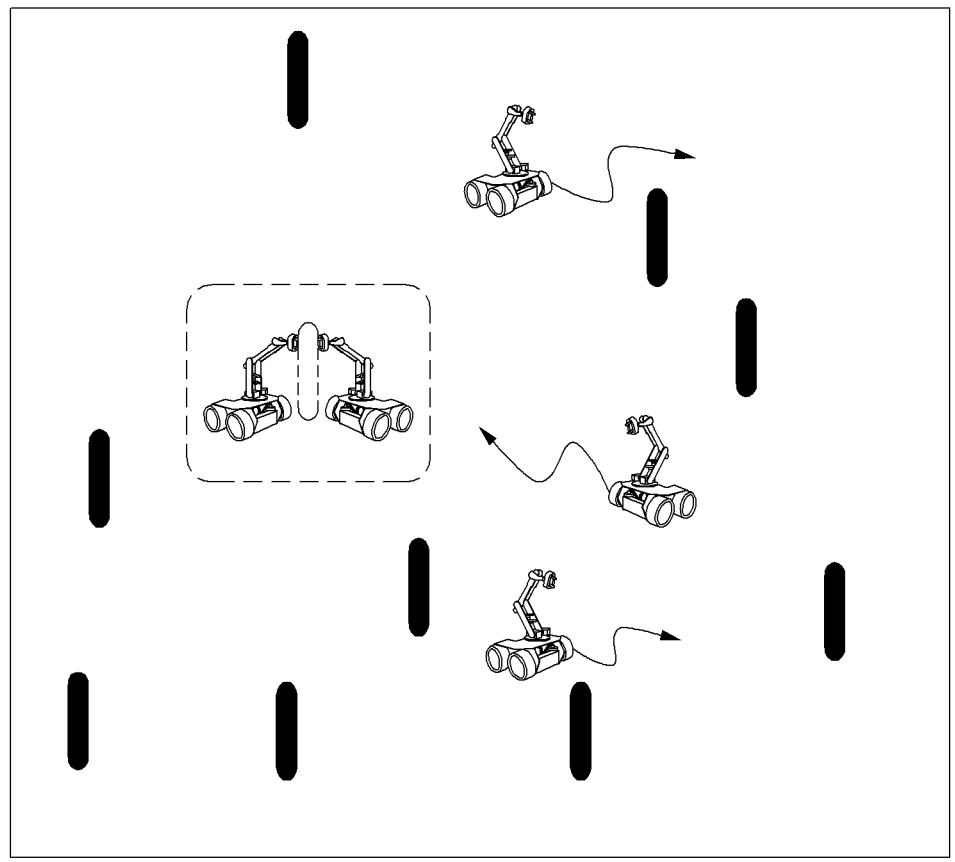

In the pull mode, the swarm robots collaboratively remove the stick. Referring to FIG. 4E, when the pull mode starts, the swarm robot removes the stick together during a predetermined time $T_P(S_j)$ (S451) and deletes the position information of the corresponding stick from the bookmark $B(R_i)$ (S452). Next, the swarm robot determines whether the information relating to the stick to remove remain in the bookmark $B(R_i)$ (S453). When there is no information, the swarm robot resets the bookmark $B(R_i)$ (S455) and enters the wander mode. Otherwise, the swarm robot returns to the previous behavior mode (S454). FIG. 5F shows that two swarm robots remove the stick in the pull mode and the stick disappears from the corresponding position.

Figure 6:
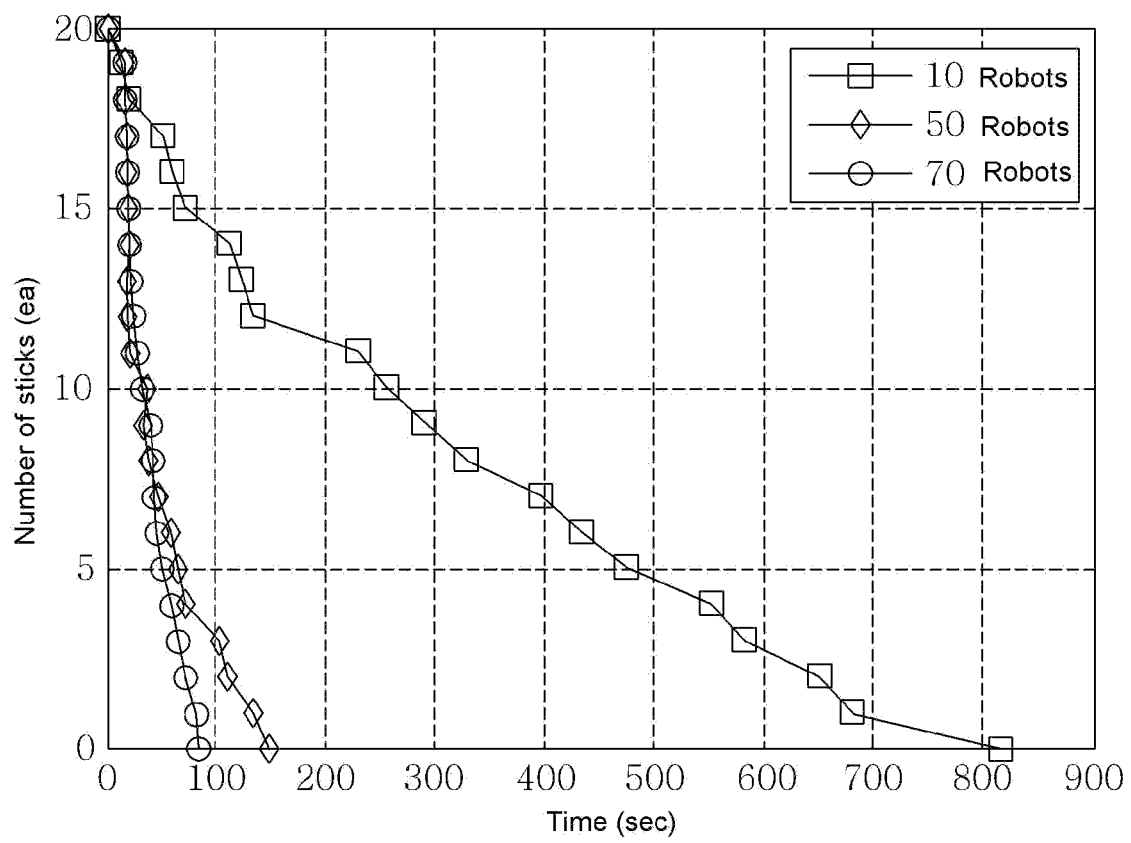
FIG. 6 is a graph of simulation results of a sweeping method according to an exemplary embodiment of the present invention.

Now, simulation results of the sweeping method using the swarm robot according to an exemplary embodiment of the present invention are explained by referring to FIG. 6.

FIG. 6 is a graph of simulation results of the sweeping method according to an exemplary embodiment of the present invention.

To verify the validity of the algorithm suggested in the present sweeping method, a simulator is implemented based on MATLAB. The operation environment of the robot is a two-dimensional environment of 100 m*100 m, a radius of every robot is 0.5 m, a maximum movement speed is 1 m/sec, and the number N of the used robots is 10, 50 and 70. To ease the understanding, with an instantaneous mobility model, it is assumed that all of the robots can accelerate at the maximum speed from the halt and change the direction without acceleration and deceleration. That is, the robot can instantly change the direction without acceleration and deceleration, and constantly move at the maximum speed. The time of the acceleration, the deceleration, or the turning can be neglected when it is considerably small compared to the moving time in the workspace. Although collisions between the robots are not considered, the robots, when coming into 0.5 m from a wall surrounding the operation environment, turn at a random angle to avoid deviation from the operation environment. There are no fixed or moving obstacles in the work environment.

It is assumed that the number $N_R(S_j)$ of the robots required to remove the stick is two and the removing time $T_P(R_i)$ is 1 sec with respect to all of the sticks. It is assumed that the robot, within 5 m from the stick, can detect the stick and obtain the accurate position information without any exceptions. The waiting time limit $E_W(R_i, S_j)$ of the robot which waits until other robots arrive is set to 10 sec.

In the simulation space, 20 sticks are removed using 10, 50 and 70 robots. In FIG. 6, the vertical axis indicates the number of the remaining sticks. As the number of the remaining sticks rapidly converges on zero, the productivity of the swarm robot increases.

When the robots greater than the number of the robots required to remove the stick at the same time are used (since two robots are required to remove the stick in this simulation, 46 robots in total are required to remove the sticks at once), that is, when 70 and 50 robots are used, the sticks are removed rapidly regardless of the distribution of the sticks or the initial position of the robots as shown in FIG. 6. However, 10 robots take the relatively much time to remove the sticks, and the robots cannot remove the sticks in some cases according to the distribution of the sticks. This is because the robots circuits and stay in a local area recorded to their stick map.

To address this problem, when the robot in the circuit mode revisits the sticks of the stick map for a certain number of times (for example, two times) and cannot remove any one stick, the robot determines that the corresponding sticks are positioned in a remote area not frequently visited by the other robots, deletes the information of this area, and moves to other area. In result, although a great amount of the time is taken for 10 robots, all of the sticks are removed completely. This is because the behavior mode for randomly wandering is given to the robots and the probability that the robots, that is, two or more robots required to remove the stick are gathered in a certain area at a certain time increases with time. In other words, there exists probability completeness when probabilities of the case where two or more robots are in a particular area of the stick at the same time increase with time, and thus all the sticks can be removed as time passes.

According to the present invention, the swarm robot can efficiently fulfill the collaborative sweeping on the unknown area and enhance the task productivity. Further, the sweeping method using the swarm robot can be adequately applied to infrastructures.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A swarm robot configured to collaborate with at least another swarm robot to remove a plurality of objects in a given sweeping area, comprising:
   a driving part for moving the swarm robot in the sweeping area;
   a manipulating part for gripping one of the objects;
   a detecting part for detecting environment information of the sweeping area;
   a locating part for locating the swarm robot in the sweeping area; and
   a control part for generating a local map and an object map using the environment information detected by the detecting part and position information obtained from the locating part, and controlling the driving part and the manipulating part to move to the object according to the local map and the object map and remove the object,
   wherein the control part is configured to control the swarm robot to work in a plurality of behavior modes including
      a wander mode for searching the sweeping area to detect an object,
      a hold mode in which the swarm robot refrains from removing the detected object,
      a sweep mode for searching an adjacent sweeping area to detect another object around the detected object,
      a circuit mode for orderly visiting a plurality of objects registered to the object map, and
      a pull mode for removing the detected object, and
   wherein the control part is configured to
      start the hold mode, and control the manipulating part to grip an object found in a behavior mode prior to the hold mode, and
      compare a waiting time of the swarm robot for the found object to a first predetermined time threshold,
         upon determining that the waiting time is longer than the first predetermined time threshold, register position information of the found object to the object map and change the swarm robot's behavior mode to the sweep mode, and upon determining that the waiting time is not longer than the first predetermined time threshold, compare the waiting time to a second predetermined time threshold that is lower than the first predetermined time threshold, upon determining that the waiting time is longer than the second predetermined time threshold and that the behavior mode prior to the hold mode is the circuit mode, change the swarm robot's behavior mode to the circuit mode, and upon determining that the waiting time is not longer than the second predetermined time threshold or that the behavior mode prior to the hold mode is not the circuit mode, determine whether the another swarm robot is gripping the found object, upon determining that the another swarm robot is not gripping the found object, wait while the manipulating part grips the found object, and upon determining that the another swarm robot is gripping the found object, compare a first number of swarm robots for removing the found object and a second number of swarm robots for waiting at the found object, upon determining that the first number is equal to the second number, change the swarm robot's behavior mode to the pull mode, and upon determining that the first number is larger than the second number, initializes the waiting time to zero.

2. The swarm robot of claim 1, wherein the object map is generated by registering a first object initially detected to a first level, a second object, additionally detected by sweeping around the first object, to a second level, and registering the objects per level in order.

3. The swarm robot of claim 1, wherein, in the wander mode, the local map of the sweeping area is updated and a revisit to an area where no object is detected is limited.

4. The swarm robot of claim 1, wherein, in the sweep mode, the object map is generated and the swarm robot's behavior mode is switched to the circuit mode when the search on the adjacent sweeping area is completed.

5. The swarm robot of claim 1, wherein the adjacent sweeping area is an area away from the detected object by a certain distance.

6. The swarm robot of claim 1, wherein, in the circuit mode, to remove the object, an order of visiting objects detected but not removed starts from an object registered to a high level to an object registered to a low level, and proceeds from an object closest to a current position to an object farthest from the current position on a same level.

7. A sweeping method using a swarm robot configured to collaborate with at least another swarm robot to remove a plurality of objects in a given sweeping area, comprising:
searching the sweeping area to detect one of the objects;
detecting environment information of the sweeping area;
acquiring a position of the swarm robot in the sweeping area;
generating a local map and an object map using the environment information and the acquired position;
moving to the object according to the local map and the object map and removing the object; and
orderly visiting a plurality of objects registered to the object map, wherein the searching includes searching an adjacent sweeping area to detect another object around the detected object, wherein the removing comprises waiting to remove the detected object, including comparing a waiting time of the swarm robot for the detected object to a first predetermined time threshold, upon determining that the waiting time is longer than the first predetermined time threshold, registering position information of the detected object to the object map, and searching the adjacent sweeping area, and upon determining that the waiting time is not longer than the first predetermined time threshold, comparing the waiting time to a second predetermined time threshold that is lower than the first predetermined time threshold, upon determining that the waiting time is longer than the second predetermined time threshold and that the orderly visiting was performed before the waiting, performing the orderly visiting again, and upon determining that the waiting time is not longer than the second predetermined time threshold or that the orderly visiting was not performed before the waiting, determining whether the another swarm robot is gripping the detected object, upon determining that the another swarm robot is not gripping the detected object, waiting while the swarm robot grips the detected object, and upon determining that the another swarm robot is gripping the detected object, comparing a first number of swarm robots for removing the detected object and a second number of swarm robots for waiting at the detected object, upon determining that the first number is equal to the second number, removing the detected object, and upon determining that the first number is larger than the second number, initializing the waiting time to zero.

8. The sweeping method of claim 7, wherein the object map is generated by registering a first object initially detected to a first level, a second object, additionally detected by sweeping around the first object, to a second level, and registering the objects per level in order.

9. The sweeping method of claim 7, wherein the searching the sweeping area comprises:
updating the local map of the sweeping area; and
limiting a revisit to an area where no object is detected.

10. The sweeping method of claim 7, wherein, when no more objects are detected in the adjacent sweeping area, the plurality of the objects registered to the object map are revisited in order.

11. The sweeping method of claim 7, wherein the adjacent sweeping area is an area away from the detected object by a certain distance.

12. The sweeping method of claim 7, wherein, in the orderly visiting, to remove the object, an order of visiting objects detected but not removed starts from an object registered to a high level to an object registered to a low level, and proceeds from an object closest to a current position to an object farthest from the current position on a same level.

* * * * *